US011188209B2

(12) United States Patent
Kaufthal et al.

(10) Patent No.: US 11,188,209 B2
(45) Date of Patent: Nov. 30, 2021

(54) PROGRESSIVE FUNCTIONALITY ACCESS FOR CONTENT INSERTION AND MODIFICATION

(71) Applicant: Microsoft Technology Licensing, LLC, Redmond, WA (US)

(72) Inventors: Jonathan S. Kaufthal, Seattle, WA (US); Maya Rodrig, Seattle, WA (US); Amani Ahmed Dye, Bothell, WA (US); Erez Kikin-Gil, Bellevue, WA (US); Charles Scott Walker, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 887 days.

(21) Appl. No.: 14/492,512

(22) Filed: Sep. 22, 2014

(65) Prior Publication Data
US 2015/0286386 A1 Oct. 8, 2015

Related U.S. Application Data

(60) Provisional application No. 61/974,383, filed on Apr. 2, 2014.

(51) Int. Cl.
*G06F 3/0484* (2013.01)
*G06F 9/451* (2018.01)
*G06F 40/274* (2020.01)

(52) U.S. Cl.
CPC ...... *G06F 3/04847* (2013.01); *G06F 3/04842* (2013.01); *G06F 3/04845* (2013.01); *G06F 9/451* (2018.02); *G06F 40/274* (2020.01)

(58) Field of Classification Search
CPC ............... G06F 3/0482; G06F 3/04842; G06F 3/04847; G06F 9/4443
See application file for complete search history.

(56) References Cited

U.S. PATENT DOCUMENTS 6,452,607 B1 9/2002 Livingston
8,214,763 B2 7/2012 Brunkhorst et al.
(Continued)

FOREIGN PATENT DOCUMENTS

CN 102929642 A 2/2013
CN 103412703 A 11/2013

OTHER PUBLICATIONS

Faithe Wempen "PowerPoint 2013 Bible, 4th Edition", published Mar. 2013, Wiley, figs. 1.17 and 9.1.*
(Continued)

*Primary Examiner* — Tan H Tran
(74) *Attorney, Agent, or Firm* — NovoTechIP International PLLC

(57) ABSTRACT

Progressive functionality command and object access for object and other content insertion and modification are provided. In a software application user interface, when a given command is selected, where the command is a parent command having one or more child commands, a subset of all available child commands under the selected parent command may be provided in the user interface in proximity to the selected parent command. If a user needs more or different commands than are presented in the subset, a contextual pane may be selectively presented in the user interface having a number of additional available commands for selection by the user. Once the contextual pane is displayed, it may stay displayed until it is manually or automatically dismissed.

20 Claims, 16 Drawing Sheets

(56) References Cited

U.S. PATENT DOCUMENTS

| | | | |
|---|---|---|---|
| 8,543,941 B2 | 9/2013 | Patterson et al. | |
| 2006/0036964 A1* | 2/2006 | Satterfield | G06F 3/0481 715/777 |
| 2010/0185978 A1 | 7/2010 | Laurie et al. | |
| 2012/0159375 A1* | 6/2012 | Shaw | G06F 3/0483 715/777 |
| 2013/0019175 A1* | 1/2013 | Kotler | G06F 3/0482 715/728 |
| 2013/0125041 A1 | 5/2013 | Doan et al. | |
| 2013/0191781 A1 | 7/2013 | Radakovitz et al. | |
| 2013/0198733 A1* | 8/2013 | Farrell | G06F 9/44526 717/173 |

OTHER PUBLICATIONS

Faithe Wempen "PowerPoint 2013 Bible, 4th Edition", published Mar. 2013, Wiley, pp. 1-24. (Year: 2013).*

"International Preliminary Report on Patentability Issued in PCT Application No. PCT/US2015/022895", dated Mar. 23, 2016, 8 Pages.

Bajaj, Geetesh, "Interface-PowerPoint 2013 for Windows", Published On: Apr. 30, 2013, Available at: http://www.indezine.com/products/powerpoint/learn/powerpoint-2013/powerpoint-2013-interface.html.

Bajaj, Geetesh, "New Format Task Panes in Powerpoint 2013", Published On: Jun. 4, 2013, Available at: http://www.indezine.com/products/powerpoint/learn/powerpoint-2013/new-format-task-panes-ppt2013.html.

Bajaj, Geetesh, "Ribbon and Tabs in Power Point 2e13 for Window", Published On: Jan. 10, 2013, Available at: http://www.indezine.com/products/powerpoint/learn/interface/ribbon-ppt2013.html.

Bajaj, Geetesh, "Types of Shapes in PowerPoint 2007 and 2010 for Windows", Nov. 19, 2010, Available at: http://www.indezine.com.

"International Search Report and Written Opinion Issued for PCT Patent Application No. PCT/US2015/022895", dated Jun. 2, 2015, 11 Pages.

"A Range of Powerful Features for your Workflow", Retrieved on: Mar. 26, 2014, Available at: http://www.nitropdf.com/pdf-reader/features.

Lourekas, et al., "Get Familiar with Panels in Adobe Illustrator CS6", Published on: Sep. 27, 2012, Available at: http://www.peachpit.com/articles/article.aspx?p=1941023.

"Second Written Opinion Issued in PCT Application No. PCT/US2015/022895", dated Dec. 22, 2015, 7 Pages.

"Office Action Issued in European Patent Application No. 15716298.3", dated May 2, 2019, 7 Pages.

"Office Action Issued In Chinese Patent Application No. 201580018434.7", dated Dec. 29, 2018, 17 Pages.

Faithe, Wempen, "PowerPoint 2013", PowerPoint 2013 Bible, Wiley, 4th Edition, Mar. 31, 2013, 2 Pages.

* cited by examiner

| | A | B | C | D | E | F | G | H | I | J | K | L | M | N | O |
|---|---|---|---|---|---|---|---|---|---|---|---|---|---|---|---|
| 1 | | | | | | | | | | Average 252 | | Count 7 | | Sum $1512 | |
| 2 | Book Category | Jan | Feb | Mar | Apr | May | Jun | Jul | Aug | Sep | Oct | Nov | Dec | Annual Total | |
| 3 | History | $51.00 | $19.00 | - | $14.00 | $94.00 | $79.00 | - | - | $250.00 | $44.00 | $46.00 | $10.00 | $607.00 | |
| 4 | Math | $72.00 | $23.00 | $23.00 | $23.00 | - | - | - | - | $79.00 | $17.00 | $40.00 | $46.00 | $323.00 | |
| 5 | Science | $78.00 | $10.00 | $18.00 | $19.00 | - | - | $86.00 | $50.00 | $100.00 | $27.00 | $48.00 | $40.00 | $476.00 | |
| 6 | English Literature | $97.00 | $13.00 | $21.00 | $22.00 | - | - | $70.00 | $58.00 | - | - | - | - | $281.00 | |
| 7 | Business | $69.00 | $15.00 | - | $22.00 | - | - | - | - | - | - | - | - | $106.00 | |
| 8 | Computer Science | $- | $16.00 | $10.00 | $18.00 | $96.00 | - | - | - | $95.00 | $37.00 | $11.00 | $46.00 | $189.00 | |
| 9 | Foreign Language | - | - | - | - | - | $94.00 | - | - | $53.00 | $16.00 | $23.00 | $19.00 | $435.00 | |
| 10 | Total | $457.00 | $96.00 | $72.00 | $118.00 | $190.00 | $173.00 | $156.00 | $108.00 | $577.00 | $141.00 | $168.00 | $161.00 | $2,417.00 | |

FIG. 2E

PROGRESSIVE FUNCTIONALITY ACCESS FOR CONTENT INSERTION AND MODIFICATION

CROSS-REFERENCE TO RELATED APPLICATIONS

This application claims the benefit of U.S. Provisional Patent Application No. 61/974,383, filed Apr. 2, 2014.

BACKGROUND

Computer and computer software users have become accustomed to generating, editing, receiving and sending many types of content items, for example, documents of different types, photographs, images, electronic mail items, calendaring items, notes items, and the like. In many software applications, a variety of commands and objects may be applied to a given content item. For example, a variety of formatting commands and/or functions may be applied to text and various objects in a document. For another example, a variety of objects, such as tables, charts, shapes, pictures, clip art, etc., may be added to a content item as stand-alone objects (e.g., clip art items) or in association with data contained in the document (e.g., a table or chart). As the number of functions and objects available to users becomes larger and larger, it becomes difficult to surface functions and objects in a manner that allows users to appreciate the fullness of what is available without overwhelming the users with too much information.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing progressive functionality command and object access for object insertion and other content modification. In a software application user interface, when a given command is selected, where the command is a parent command having one or more child commands, a subset of all available child commands under the selected parent command may be provided in the user interface in proximity to the selected parent command. If a user needs more or different commands than are presented in the subset, a contextual pane or similar surface for hosting additional user interface elements may be selectively presented in the user interface having a number of additional available commands for selection by the user. Once the contextual pane is displayed, it may stay displayed until it is manually dismissed or until it is dismissed when it is no longer relevant to the context of the being-edited content item. The pane may also be dismissed when a command outside the context of the pane is selected, and the pane may be dismissed when it times out after a period of inactivity or if insufficient display space is available for maintaining the display.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

DESCRIPTION OF THE DRAWINGS

FIG. 2E illustrates a computer generated user interface with which a variety of commands and/or functions may be applied to a given content item.

FIG. 2I illustrates a computer generated user interface with which a variety of commands and/or functions may be applied to a given content item and illustrates deployment and display of a contextual pane showing additional functions and commands available under the selected parent command.

DETAILED DESCRIPTION

Figure 1:
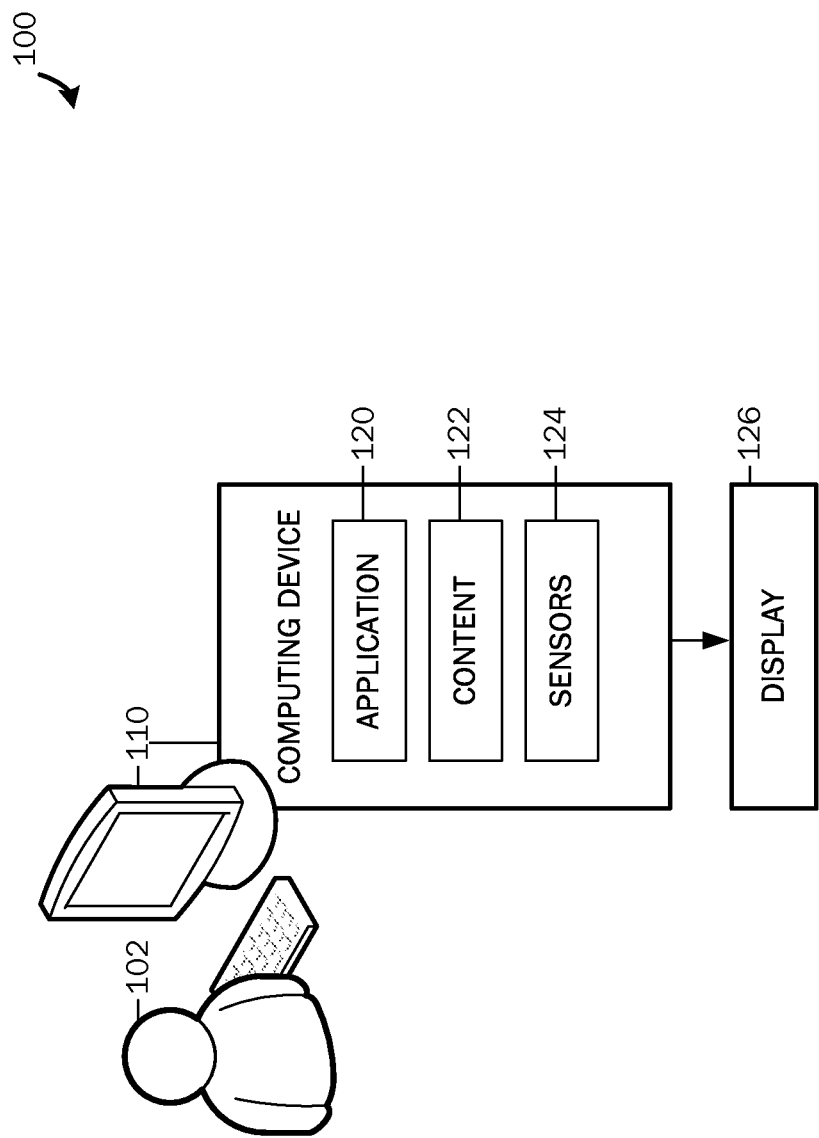
FIG. 1 illustrates a system architecture in which embodiments of the present invention may be practiced.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to providing progressive access to commands for content and object insertion and modification. In a software application user interface, a variety of functionality commands may be provided to allow formatting, layout, design, object and other content insertion, electronic communication, review, and the like. Often, such commands may be provided in an array of buttons or controls in one or more menus, for example, drop-down menus. According to embodiments, when a given command is selected, where the command is a parent command having one or more child commands, a subset of all available child commands under the selected parent command may be provided in the user interface in proximity to the selected parent command. If a user needs more commands than are presented in the subset, or if the user needs a different command than is presented in the subset, a contextual pane or similar user interface surface may be selectively presented in the user interface having a number of additional available commands for selection by the user. Available commands may include a variety of formatting, layout and content structuring commands, as well as a number of object insertion commands and object formatting, structuring, layout and defining commands.

Once the contextual pane is displayed, it may stay displayed until it is manually dismissed or until it is dismissed when it is no longer relevant to the context of the being-edited content item. The pane may also be dismissed when a command outside the context of the pane is selected, and the pane may be dismissed when it times out after a period of inactivity or if insufficient display space is available for maintaining the display.

FIG. 1 is a block diagram illustrating a system architecture 100 for providing progressive functionality command and object access for object insertion and modification. The network architecture 100 includes a computing device 110. The computing device 110 may be one of various types of computing devices (e.g., a tablet computing device, a desktop computer, a mobile communication device, a laptop computer, a laptop/tablet hybrid computing device, a large screen multi-touch display, a gaming device, a smart television, or other types of computing devices) for executing applications 120 for performing a variety of tasks.

A user 102 may utilize an application 120 on a computing device 110 for a variety of tasks, which may include, for example, to write, calculate, draw, organize, prepare presentations, send and receive electronic mail, take and organize notes, make music, and the like. Applications 120 may include thick client applications, which may be stored locally on the computing device 110 (as illustrated in FIG. 1), or may include thin client applications (i.e., web applications) that may reside on a remote server and accessible over a network, such as the Internet or an intranet. A thin client application may be hosted in a browser-controlled environment or coded in a browser-supported language and reliant on a common web browser to render the application executable on a computing device 110. The computing device 110 may be configured to receive content 122 for presentation on a display 126 (which may comprise a touch screen display).

An application 120 may be configured to enable a user 102 to use a pointing device (e.g., a mouse, pen/stylus, etc.) and/or to utilize sensors 124 (e.g., touch sensor, accelerometer, hover, facial recognition, voice recognition, light sensor, proximity sensor, gyroscope, tilt sensor, GPS, etc.) on the computing device 110 to interact with content 122 via a number of input modes. To assist users to locate and utilize functionalities of a given application 120, a user interface (UI) 200 containing a plurality of selectable functionality controls and elements may be provided. According to embodiments and as will be described below in greater detail with reference to FIGS. 2A-2J, progressive transition of provided application functionalities may be provided in the UI 200.

FIGS. 2A-2J illustrate various functionality commands, objects that may be inserted in various content items, e.g., documents, and various styles and formatting attributes that may be applied to various objects. As should be appreciated, the various visual representations illustrated in FIGS. 2A-2J are for purposes of example only and are not limiting of the vast numbers of different visual representations that may be provided for enabling object insertion and modification according to embodiments of the invention.

Figure 2A:
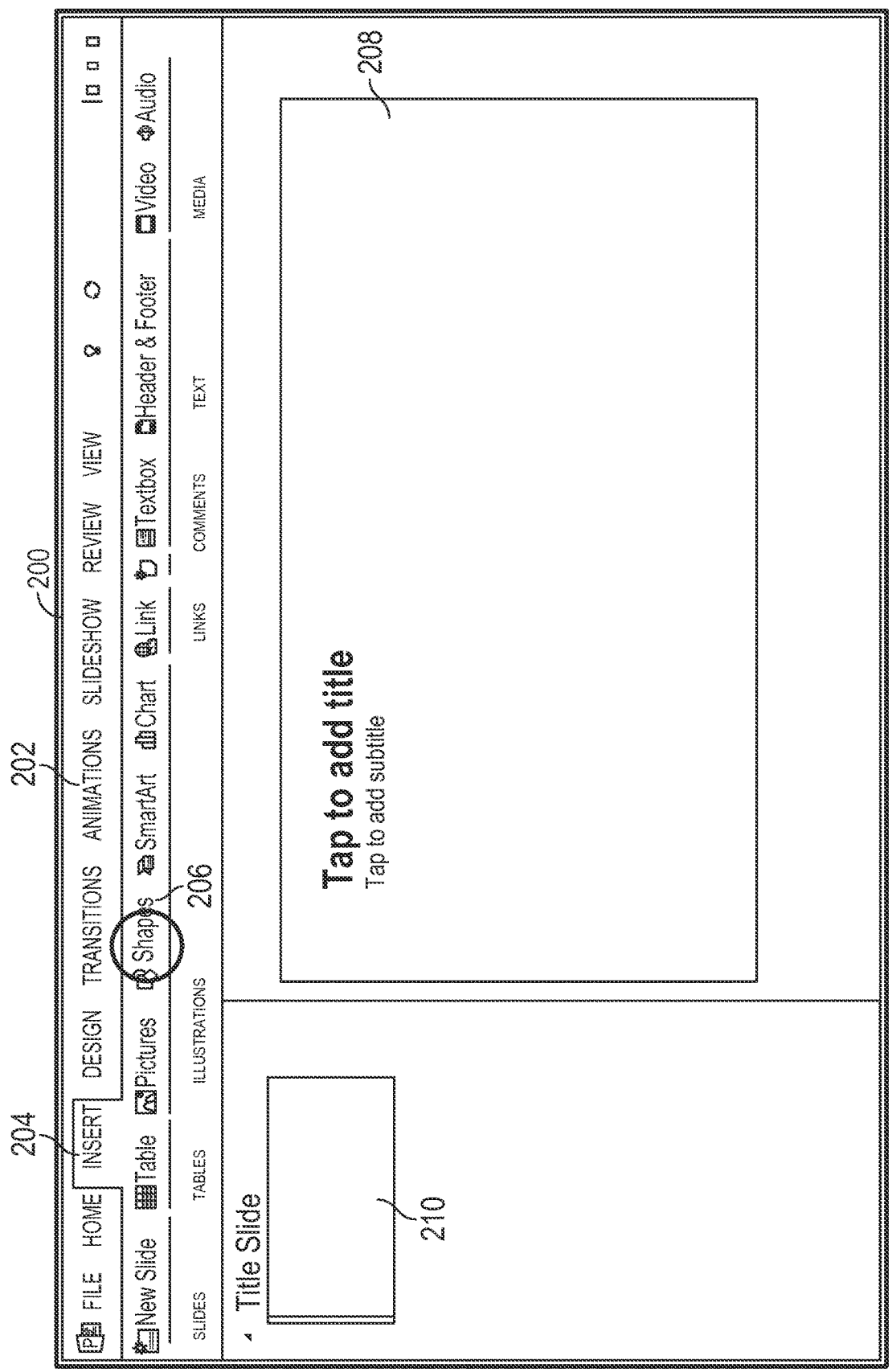
FIG. 2A illustrates a computer generated user interface with which a variety of commands and/or functions may be applied to a given content item.

As illustrated in FIG. 2A, an example user interface 200 is provided with which a variety of content items 208 may be entered, formatted, structured, and edited according to a variety of commands and functionalities available to a software application providing the user interface 200. For example, the user interface 200 illustrated in FIG. 2A is an example slide presentation application user interface with which one or more presentation slides may be generated as desired. An example of such a slide presentation application includes POWERPOINT provided by MICROSOFT CORPORATION. As should be appreciated, and as will be described herein, the example slide presentation application user interface 200 is for purposes of example and illustration only and is not limiting of other types of software application user interfaces that may be utilized in accordance with embodiments of the present invention. For example, other software application user interfaces may include word processing application user interfaces, spreadsheet application user interfaces, notes taking application user interfaces, electronic communications user interfaces, calendar application user interfaces, tasks and reminder application user interfaces, and the like. That is, any software application that provides a computer-generated user interface 200 with which one or more commands and/or functions may be utilized may be used in accordance with embodiments of the present invention.

Referring still to FIG. 2A, an array of top level or parent level commands and/or functions 202 is illustrated at the top of the user interface 200. Each of the commands 202 illustrated in the top level array of commands and/or functions may operate as a standalone command wherein selection of the command may provide a single function, or each of the top level commands may be a parent command having a number of associated child commands that may be exposed by selection of the parent command. For example, as illustrated in FIG. 2A, selection of the insert command 204 may provide a display of a variety of child commands, including the "new slide" command, the "table" command, "pictures" command, the "shapes" command, the "smart art" command, "chart" command, and so on. That is, selection of the top level insert command 204 provides an array of child commands that may be selected by a user for application of the associated functionality to a content item 208 being generated or edited in the user interface 200. For example, selection of the "new slide" command may result in the insertion of a new presentation slide in the content item 208. Selection of the "table" command may result in the insertion of a table object into the content item 208.

As should be appreciated, the display of the various functionality commands illustrated in FIG. 2A in rows of functionality commands or in an array of functionality commands is for purposes of example and illustration only and is not limiting of other arrangements with which such functionality commands may be provided. For example, each of the child commands 206 may be provided in a dropdown menu underneath an association parent command. That is, according to a dropdown menu configuration, selection of a parent command such as the insert command 204 may cause the presentation of a dropdown menu that exposes the child functionality command 206. According to embodiments, in some cases, selection of one of the child commands 206 may result in the display or presentation of additional commands that are child commands under the selected child command. For example, selection of a "table" command may result in the presentation of a variety of different table objects that may be inserted into the content item 208. Likewise, selection of the "pictures" command may result in the presentation of a list of a number of pictures that may be selected for insertion in the content item 208, and so on.

Referring still to FIG. 2A, selection of a "shapes" command 206 is illustrated by receiving a tap on the "shapes" command button 206. As should be appreciated, the illustration of a tap on the button 206 is for purposes of illustration of the use a touch-enabled computing device on which the user interface 200 may be displayed. As should be appreciated, other means of interacting with the commands contained in the user interface 200 may include keyboard input, mouse input, voice activated input, eye tracking input, gesture input, and the like.

According to embodiments, in response to a selection of the example "shapes" command 206, a set of available child commands of the selected example "shapes" command may be provided in proximity to the selected command either as an additional array of selectable commands or as an array or collection of additional commands in a menu such as a dropdown menu that may be dropped down beneath the selected command.

According to an embodiment, in addition to selecting a given command such as the "shapes" command 206, additional functionality commands associated with the example "shapes" functionality command 206 may be provided in response to selection of a shape object already contained in the content item 208. For example, if the content item 208 illustrates a slide contained in a slide presentation being generated or edited in the user interface 200, a shape object may already be present in the slide 210. Thus, selecting, for example tapping on, the shape object already present in the example slide 210 may cause a presentation of additional functionality commands associated with shapes in the same manner as would occur upon selection of the "shapes" command 206.

Figure 2B:
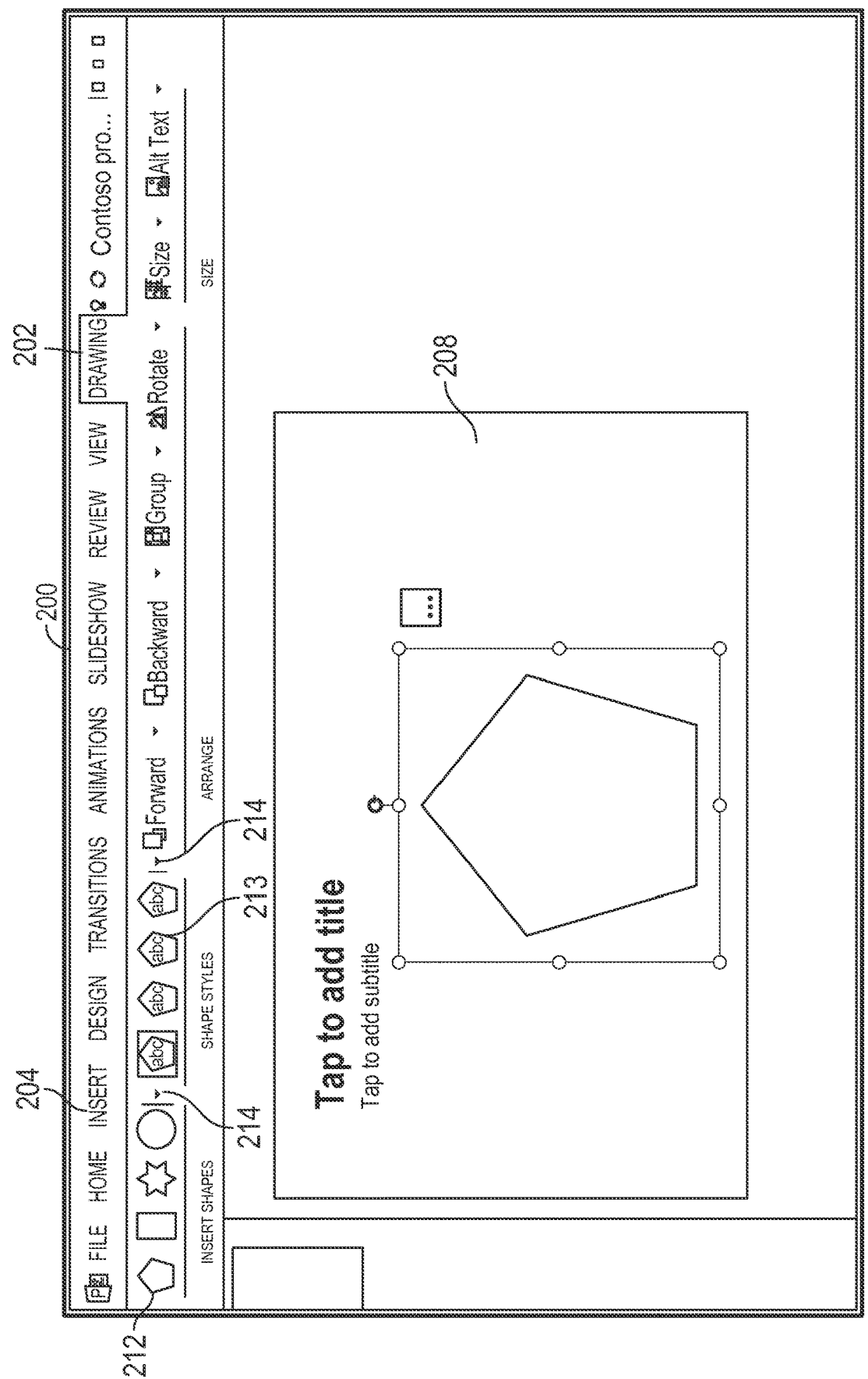
FIG. 2B illustrates a computer generated user interface with which a variety of commands and/or functions may be applied to a given content item and illustrates a subset of available commands under a selected parent command.

Referring now to FIG. 2B, in response to selection of the shapes functionality command 206, as illustrated in FIG. 2A, an array or gallery 212 of shapes that may be inserted into the content item 208 (e.g., slide presentation slide) are provided in a row of buttons and/or controls immediately beneath the top level functionality command buttons and controls. According to embodiments, each of the arrays or galleries of functionality buttons or controls 212, 213 are comprised of a subset of all available functions that may be available to the example slide presentation application in association with the selected parent shapes function 202. For example, the array 212 illustrates four different shapes including a pentagon shape, a square shape, a star shape, and circle shape. Likewise, the array 213 illustrates four different shape styles that may be applied to a pentagon shape. For example, shape styles may include such styles as shading, bold facing, line thickness, and the like.

Referring to FIGS. 2A and 2B, according to embodiments, the galleries of shapes, styles, and the like, that may be provided for each selected functionality command 206 are a subset of available functionality commands decided by a developer of the associated software application or from testing or historical data that indicates that those functionality commands provided in the galleries 212, 213 are those functionality commands most likely used or most often used in association with the selected parent function, for example, the shapes function 206. According to one embodiment, the functionality commands displayed in such galleries of commands 212, 213 may be based on historical use associated with a given user of the user interface 200. For example, if a given user of the user interface 200 utilizes a pentagon shape more often than other shapes, then the pentagon shape may be displayed in the gallery of shapes 212, but if the user never uses a triangle shape, or if the user uses a triangle shape infrequently, then the triangle shape may not be included in the gallery of shapes 212. According to another embodiment, the order of commands may be based on inferred usage of the associated commands based on inspection of the current content type's content, structure, or other existing context. For example, if a given document contains only pentagons and squares, then pentagon and square shapes may be displayed in the gallery 212 ahead of other shapes. As should be appreciated, the gallery of shapes 212 and the gallery of shapes styles 213 are for purposes of example and illustration only, and are not limiting of the vast numbers and combinations of functionality commands that may be assembled in a gallery of a subset of available commands that may be provided in response to the selection of a given functionality command, as described herein.

Referring still to FIG. 2B, a down arrow icon 214 is displayed adjacent to each of the galleries 212, 213 for selectively obtaining additional functionality commands for each array. For example, selection of the down arrow icon 214 positioned adjacent to the gallery 212 may be selected for obtaining additional shapes that may be inserted into the content item 208 in addition to the five shapes provided in the gallery 212. Similarly, selection of the down arrow 214 positioned adjacent to the gallery 213 may cause a display of additional shape styles that may be applied to one or more inserted shapes.

Figure 2C:
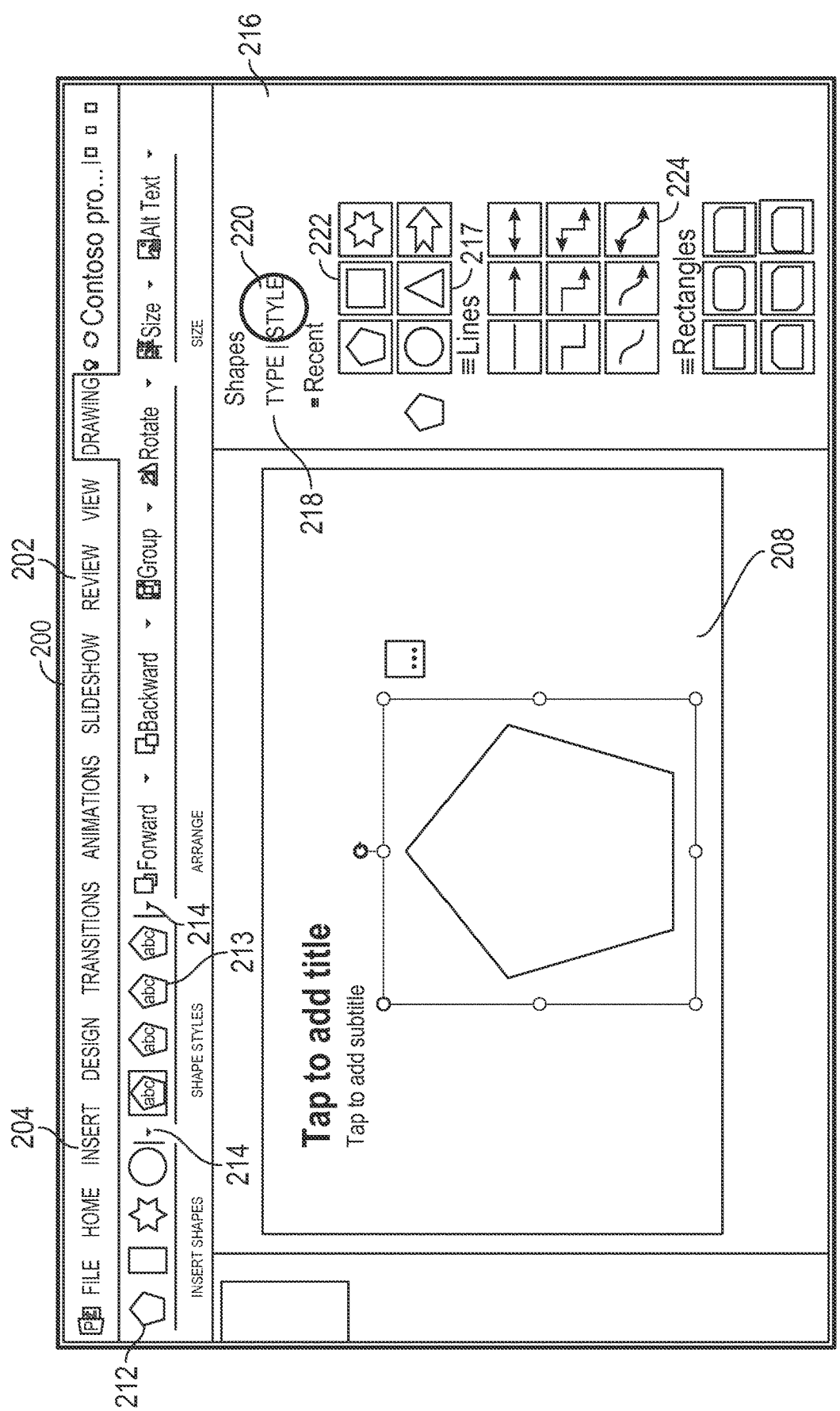
FIG. 2C illustrates a computer generated user interface with which a variety of commands and/or functions may be applied to a given content item and illustrates deployment and display of a contextual pane showing additional functions and commands available under the selected parent command.

Referring now to FIG. 2C, if a user determines that the functionality commands provided in a gallery of functionality commands 212, 213 do not include a desired functionality command, or if the user simply wishes to peruse other available functionality commands, the user may select the down arrow command 214 adjacent to the desired gallery 212, 213 for causing a display of a contextual pane 216 illustrated on the right side of the user interface 200 in FIG. 2C. While referred to as a contextual pane herein, it should be appreciated that any suitable user interface component in which may be provided various additional functionality commands may be utilized for progressively providing more functionality as described herein. In the contextual pane 216, a variety of conditional functionality commands may be provided for allowing the user to either peruse available additional commands, or for allowing the user to select one or more additional functionality commands for application to the content item 208, as desired. For example, if the user determines that the four example shapes provided in the gallery of shapes 212 do not include a shape desired by the user for a given context of a content item 208, the user may select the down arrow 214 for causing a display of the contextual pane 216 for seeing additional available shapes that may be utilized in accordance with the example slide presentation application.

In addition to selecting the down arrow 214, other selection means, for example, voice command, gesture command, and the like may be utilized for actuating the down arrow icons 214. In addition, other selection means may be utilized for launching the contextual pane 216 other then selections of the down arrows 214. For example, tapping, selecting, or otherwise actuating in the area of the user interface set aside for display of the contextual pane 216 may cause an automatic display of the contextual pane 216 in association with the presently displayed gallery of functionality commands 212, 213. Moreover, if the gallery of functionality commands 212, 213 are presently deployed and displayed, then tapping or otherwise selecting a corresponding object in the content item 208, for example, the pentagon object, may cause an automatic display of the contextual pane 216.

As illustrated in FIG. 2C, the contextual pane 216 is displayed on the right side of the user interface 200. As should be appreciated, the contextual pane may be displayed in other locations of the user interface 200, for example, on the left side of the user interface 200, on the bottom of the user interface 200, or in an upper portion of the user interface 200 beneath the bottom row or section of functionality buttons and controls.

According to one embodiment, an intermediary provision of the additional functionality commands may be provided between provision of the gallery of functionality commands 212, 213 and provision of the contextual pane 216. According to this embodiment, upon selection of the down arrow icon 214, a dropdown menu or other user interface component may be deployed for providing additional functionality commands, before deploying the contextual pane 216.

Referring now to the contextual pane 216, a number of additional functionality commands are provided, which when selected may be operated on a desired content item 208. For example, in response to a selection of the triangle shape 217, the pentagon shape presently displayed in the content item 208 may be replaced with the triangle shape. Thus, if the user had originally selected a pentagon shape from the gallery of shapes 212, but later decided that a different shape was desired for the content item 208, then the user may launch the contextual pane 216, followed by selection of a different shape, for example, the triangle shape 217, for application to the content item 208, as desired.

Referring still to the contextual pane 216, according to embodiments of the present invention, a given contextual pane 216 may contain a vast number of different types of the functionality commands associated with inserting or modifying the selected content according to the functionality of the associated software application (e.g., slide presentation application). In addition to the functionality commands illustrated in the pane 216, the contextual pane 216 may be operative for selectively displaying yet additional functionality commands. For example, referring to the contextual pane 216 a shapes types function 218 and a shapes style function 220 are provided. According to an embodiment, selection of the shapes type function 218 may cause a display of various shape types that may be applied to the content item 208. A first array 222 includes a number of shapes most recently used with the user interface 200. A second array 224 includes a variety of lines shapes that may be used in association with the other shapes, as desired. As should be appreciated, the recent shapes array 222 and the lines array 224 are for purposes of illustration and example only, and are not limiting of other arrays of shapes types that may be provided in the contextual pane 216. Referring still to the contextual pane 216, selection of the shapes style function 220 may cause a display of a number of additional shapes styles in addition to the gallery of shapes styles 213 initially provided upon selection of the shapes function 206.

According to an embodiment, the functionality commands provided in the contextual pane 216 may be provided in a hierarchal manner, based on context, based on historical usage, or other factors. For example, functionality commands associated with a shape type may be provided first followed by functionality commands associated with a shape style, where it may be assumed that a user must first select a shape type before applying a shape style. In terms of context, if a user selects an object already present in a content item, for example, if a user selects the example pentagon shape contained in the content item 208, as illustrated in FIG. 2C, then the functionality commands provided in the contextual pane 216 may be automatically replaced, if necessary, by functionality commands associated with shape styles that may be applied to a pentagon shape, because it may be assumed that if the user is selecting the pentagon shape contained in the content item 208, then the user next desires to apply a style or other formatting function to a pentagon shape.

In terms of historical usage, if a given user historically uses only shapes provided in the subset of shapes provided in the gallery of shapes 212, but typically uses styles shapes from a larger set of styles than is provided in a gallery of styles 213, then upon deployment of the contextual pane 216, styles that may be applied to an inserted shape may be provided first based on the user's historical use of styles from the deployed contextual pane 216. In addition, according to an embodiment, if a given shape and/or styled is applied to an object contained in the content item 208, then a corresponding shape and/or style provided in the galleries 212, 213 and contextual pane 216 may be highlighted for providing the user an indication of the presently utilized shape and/or style. For example, given that the object presently inserted in the content item 208 is a pentagon shape, then the corresponding pentagon shape functionality command contained in the gallery 212 or the contextual pane 216 may be highlighted to indicate that shape is presently applied to the content item.

Referring still to FIG. 2C, after a given user has utilized all desired functionality commands from the displayed contextual pane 216, the user may manually dismiss the contextual pane 216 by selecting a dismissal button or function, as desired. Alternatively, if the user does not manually dismiss the contextual pane 216, then the contextual pane 216 may stay displayed until the functionality commands provided in the contextual pane 216 are no longer relevant to operations being conducted in association with the content item 208. For example, if the contextual pane 216 contains shapes or shape styles associated with a shape inserted into the content item 208, but the user has displayed a different content item in the user interface 200 that is text only, or that contains other objects for which the functionality commands presently displayed in the contextual pane 216 may not be applied, then the contextual pane 216 may automatically be dismissed owing to a lack of relevance to the present content item 208. In addition, the contextual pane may be dismissed if it is displayed on a small form device, and a determination is made that display space being occupied by the pane 216 is needed for other displayed items.

Other means for dismissing the contextual pane 216 may include tapping or selecting away from the contextual pane 216, for example, tapping or selecting a portion of the user interface 200 associated with other functionality commands for which the functionality commands presently displayed in the contextual pane 216 are not applicable. In addition, the contextual pane 216 may be automatically dismissed after a certain timeout period in which the contextual pane 216 is not utilized. For example, if no functionality commands are selected from the contextual pane 216 after a given time period, for example, 45 seconds, then the contextual pane 216 may be automatically dismissed based on an assumption that the functionality commands contained therein are no longer applicable nor desired.

The description above with reference to FIGS. 2A through 2C describes embodiments of the present invention in terms of inserting and formatting shapes in association with a content item. As should be appreciated, however, embodiments of the present invention may be utilized in any case where a set of functionality commands may be provided in response to selection of a parent functionality command, and where the progressive transition may be provided to a larger set of functionality commands as needed or desired by the user. FIGS. 2D through 2J illustrate embodiments of the present invention in other functionality command contexts.

Figure 2D:
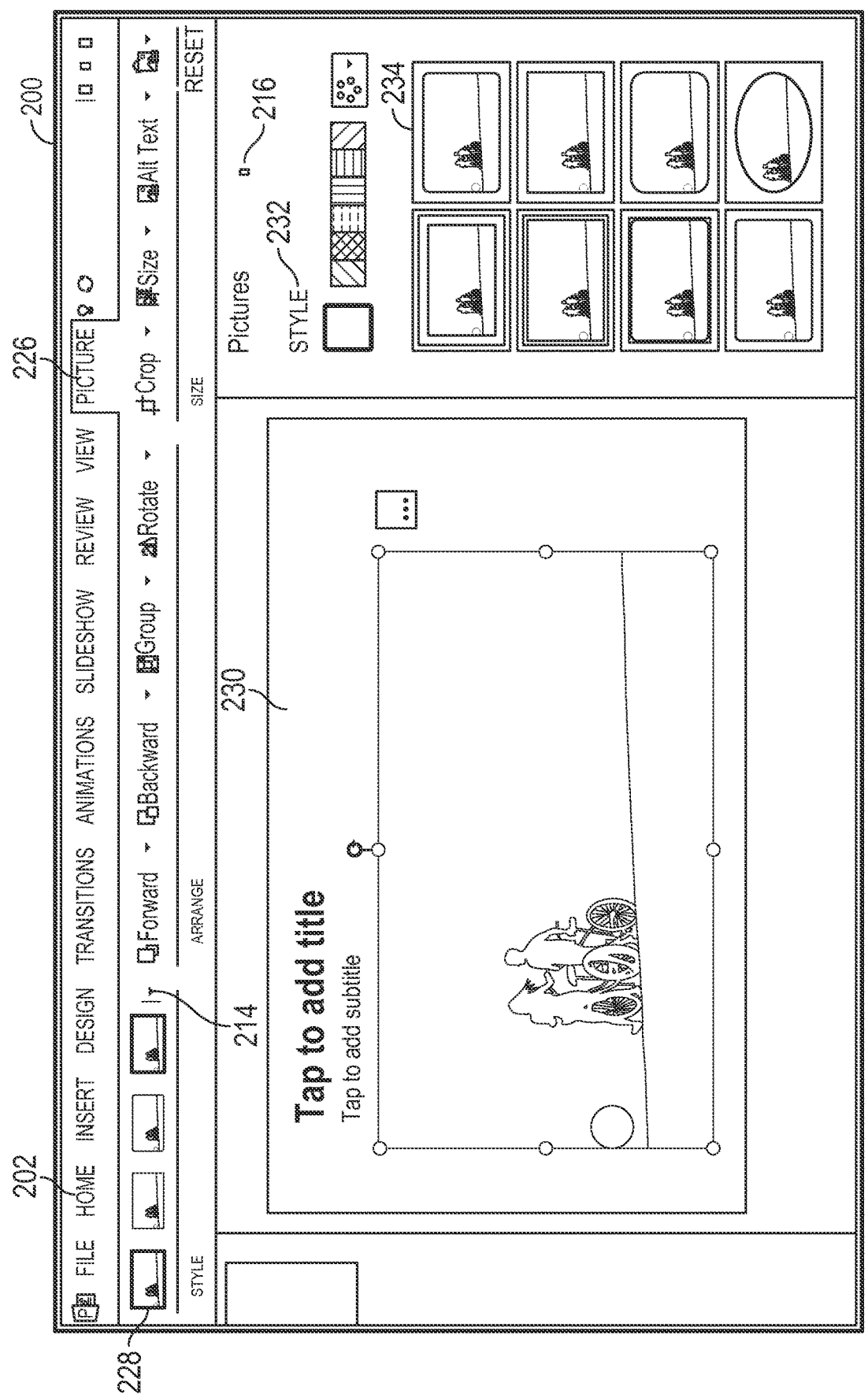
FIG. 2D illustrates a computer generated user interface with which a variety of commands and/or functions may be applied to a given content item and illustrates deployment and display of a contextual pane showing additional functions and commands available under the selected parent command.

Referring now to FIG. 2D, embodiments of the present invention are described with reference to functionality commands associated with pictures and other images that may be applied to a content item. As illustrated in FIG. 2D, the user interface 200 is provided with which a content item, for example, a slide presentation document 230 may be generated and/or edited. As described above with reference to FIG. 2A, a number of top level or parent functionality commands 202 are illustrated which when selected may provide additional child commands under each selected top level command. As illustrated in FIG. 2D, selection of a picture command 226 may result in a gallery or array 228 of pictures that may be selected for inserting into a desired content item 230. If the pictures provided in the gallery or array 228 do not satisfy the user generating and/or editing the content item 230, the user may select the down arrow icon 214, or utilize one of the previously described other means for displaying the contextual pane 216, as illustrated at the right side of the user interface 200 in FIG. 2D.

Referring to the contextual pane 216, illustrated in FIG. 2D, an additional array of pictures or other images 234 is provided, and a style function 232 is provided for applying various styles to one of the selected pictures from the array 234. Selection of the style function 232 may cause a display of an additional array of functionality commands in the contextual pane 216 for application to an inserted picture or other image in the content item 230.

Referring now to FIG. 2E, an example spreadsheet application user interface 201 is illustrated in which a spreadsheet 238 has been generated containing a variety of data items. According to an embodiment, another object that may be inserted and formatted or otherwise structured according to embodiments of the present invention includes a chart object. Referring to FIG. 2E, selection of the top level function 236 may cause a display of a number of child functions, for example, the "table" functionality command, the "pictures" functionality command, the "shapes" functionality command, the "charts" functionality command, and the like. As described herein, selection of one of the child functionality commands, for example with "chart" functionality command 237 may cause a display of contextual pane 216 for providing a variety of selectable chart objects that may be applied to the data contained in the example spreadsheet 238.

Figure 2F:
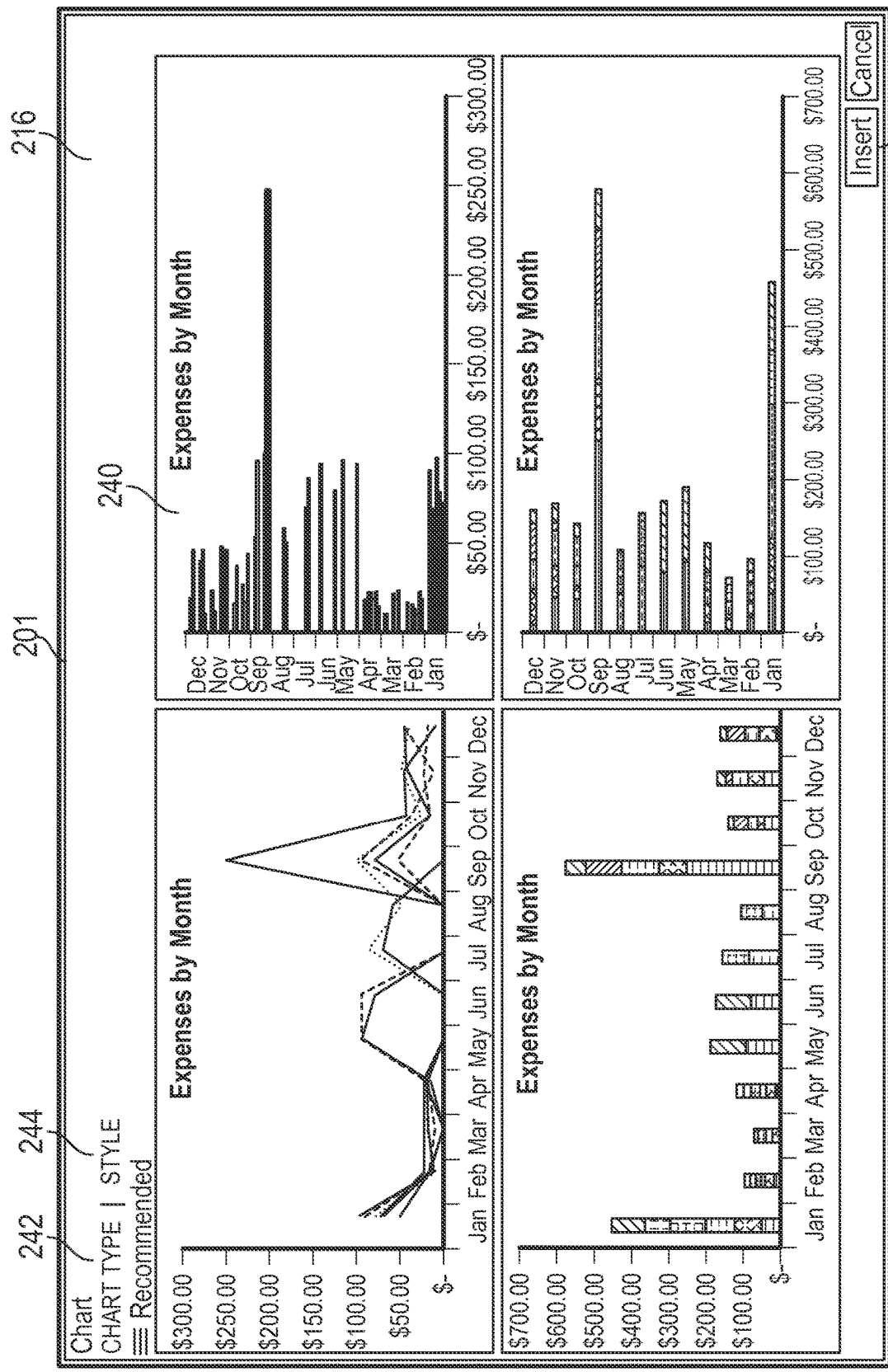
FIG. 2F illustrates a computer generated user interface with which a variety of commands and/or functions may be applied to a given content item and illustrates deployment and display of a contextual pane showing additional functions and commands available under the selected parent command.

Referring to FIG. 2F, an array of chart objects 240 that may be displayed in a contextual pane 216 in the example spreadsheet application user interface 201 is illustrated. As should be appreciated, the array of chart objects 240 illustrated in FIG. 2F is illustrated in an enlarged manner for purposes of illustration, and as should be appreciated, the array of table objects 240 would be displayed in a contextual pane 216 in the user interface 201, in a similar manner as illustrated and described above with reference to FIGS. 2C and 2D. Referring still to FIG. 2F, a chart type function 242 and a chart style function 244 are provided for allowing a user to toggle between two display offerings in the contextual pane 216. That is, selection of the chart type function 242 may cause a display of various chart types, for example, line graph charts, bar charts, pie charts, and the like. Similarly, selection of the chart style function 244 may provide a display of various styles including coloring, line thickness, and the like that may be applied to components of a displayed table or chart object.

An insert function 248 is illustrative of a function for selectively inserting a displayed chart or particular object from the contextual pane 216 into the corresponding content item 238 (e.g., spreadsheet) illustrated in FIG. 2E. Thus, as illustrated in FIGS. 2E and 2F, a progressive transition from an initial display of a small number of chart objects that may be applied to the example spreadsheet document is provided to a contextual pane 216 wherein a larger set of chart types and styles are provided that may be applied to the example spreadsheet document.

Figure 2G:
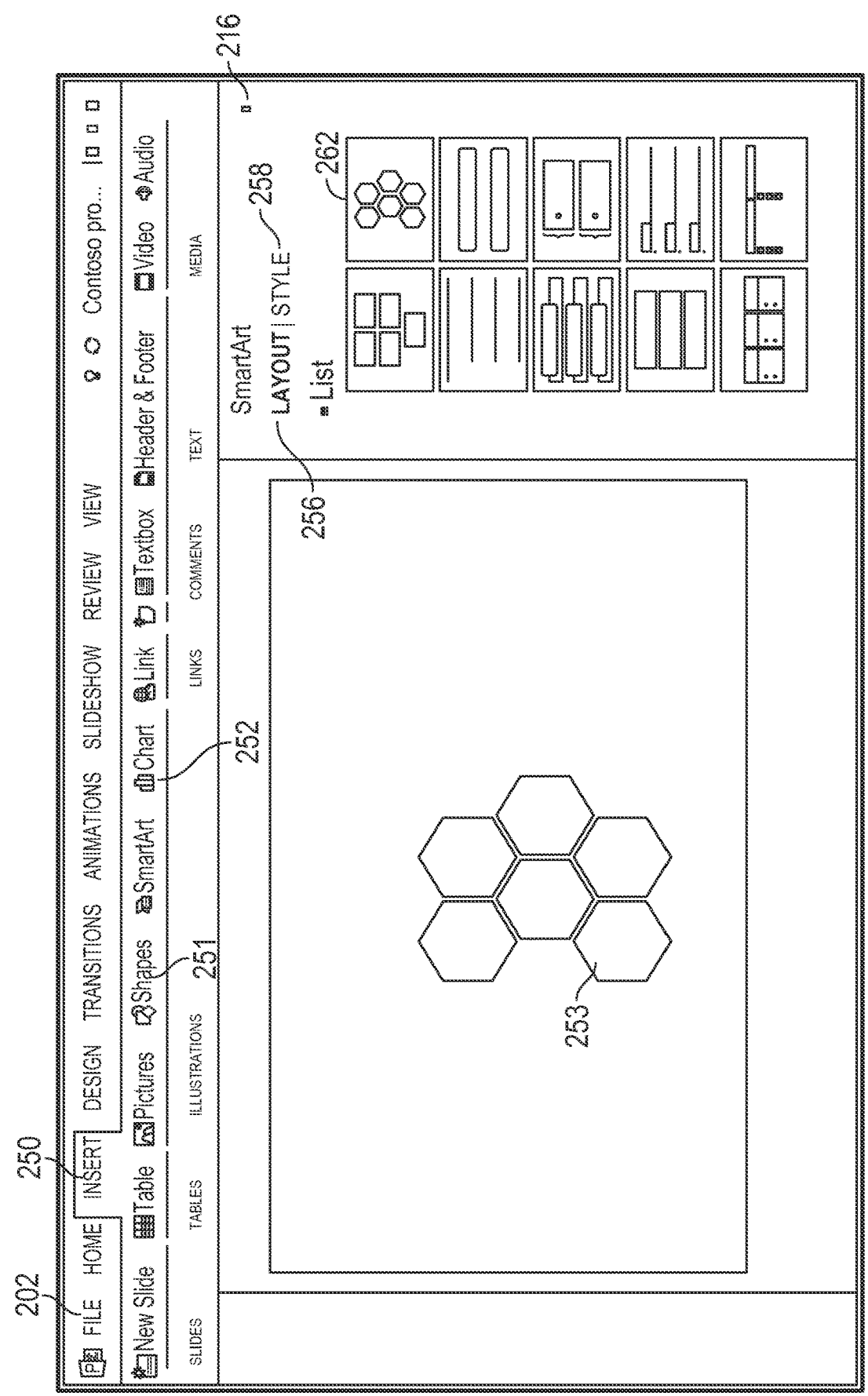
FIG. 2G illustrates a computer generated user interface with which a variety of commands and/or functions may be applied to a given content item and illustrates deployment and display of a contextual pane showing additional functions and commands available under the selected parent command.

Referring now to FIG. 2G, insertion and/or formatting associated with clip art or artistic shapes/styles is illustrated and described. As illustrated in FIG. 2G, the user interface 200 associated with an example slide presentation application includes one or more top level functionality commands 202, as described above. In response to selection of an insert functionality command 250, a row of child functionality commands 251 is illustrated as being displayed underneath the top level row of commands 202 in association with the selected insert command. In response to a selection of the "SmartArt" functionality command 252, an array or gallery of art layouts and art styles that may be applied to a content item 253 may be provided underneath the selected the functionality command 252, as described above with reference to FIG. 2C. An example of such functionality may include SMARTART from Microsoft Corporation that allows for application of various artistic and pleasing artistic shapes or styles to various data items.

Alternatively, if it has been determined that there is no logical listing of a subset of the available art layouts and styles that may be displayed in a gallery or array of functionality commands underneath the functionality command 252, then selection of the functionality command 252 may cause an automatic display of the contextual pane 216, as illustrated in FIG. 2G. That is, according to one embodiment, a progressive provision of functionality commands for object insertion and modification may progress directly from a selection of a parent or child level functionality command to the provision of the contextual pane 216.

Referring to the contextual pane 216, illustrated in FIG. 2G, an array of graphical layout types 262 are provided in the pane 216 that may be selected for insertion into the content item 253. The layout function 256 may be used for displaying layout object types in the array 262, and a style function 258 may be used for displaying object styles in the array 262.

Figure 2H:
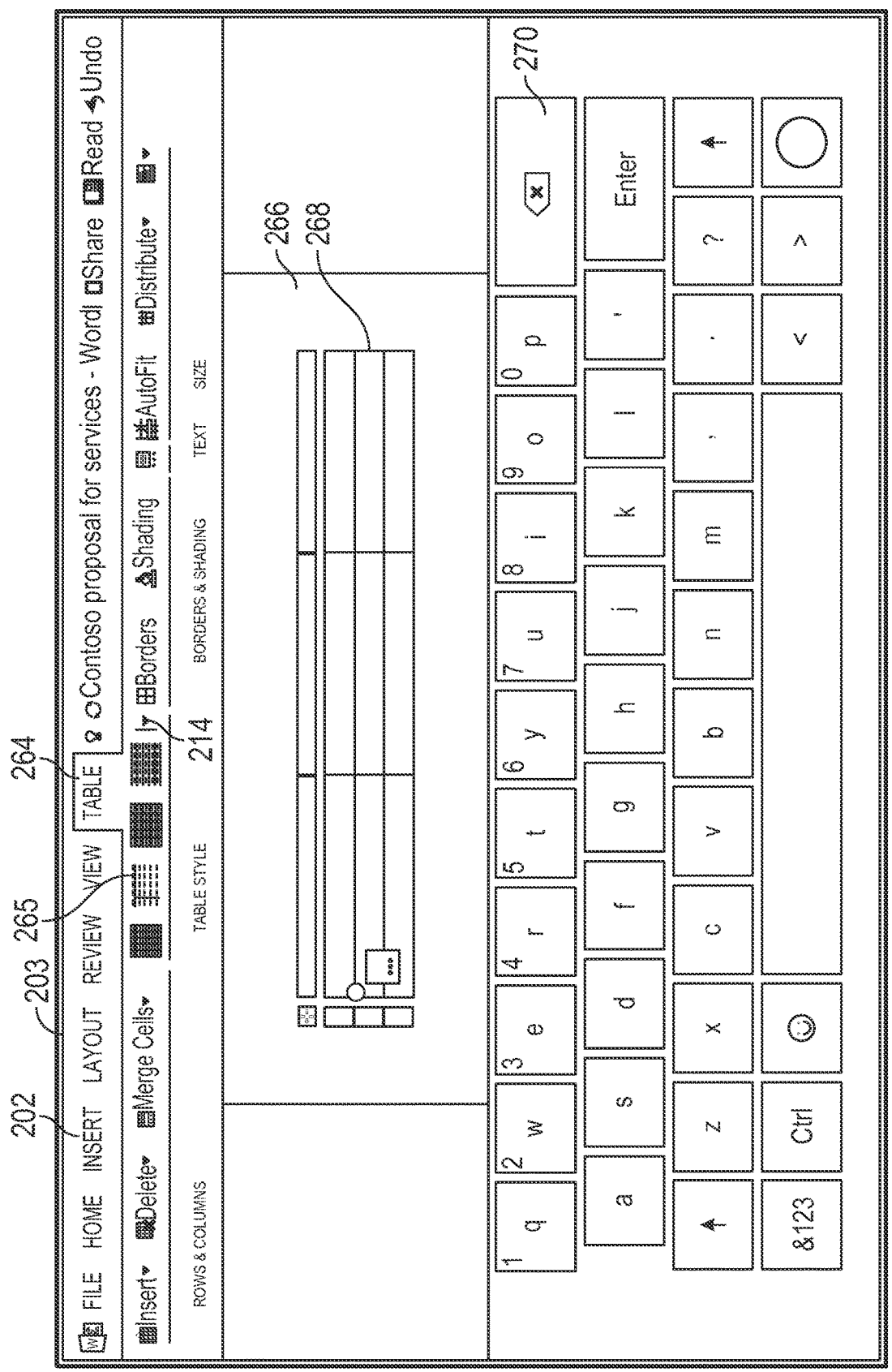
FIG. 2H illustrates a computer generated user interface with which a variety of commands and/or functions may be applied to a given content item and illustrates a subset of available commands under a selected parent command and illustrates a soft keyboard for entering data in an example table object.
Figure 21:
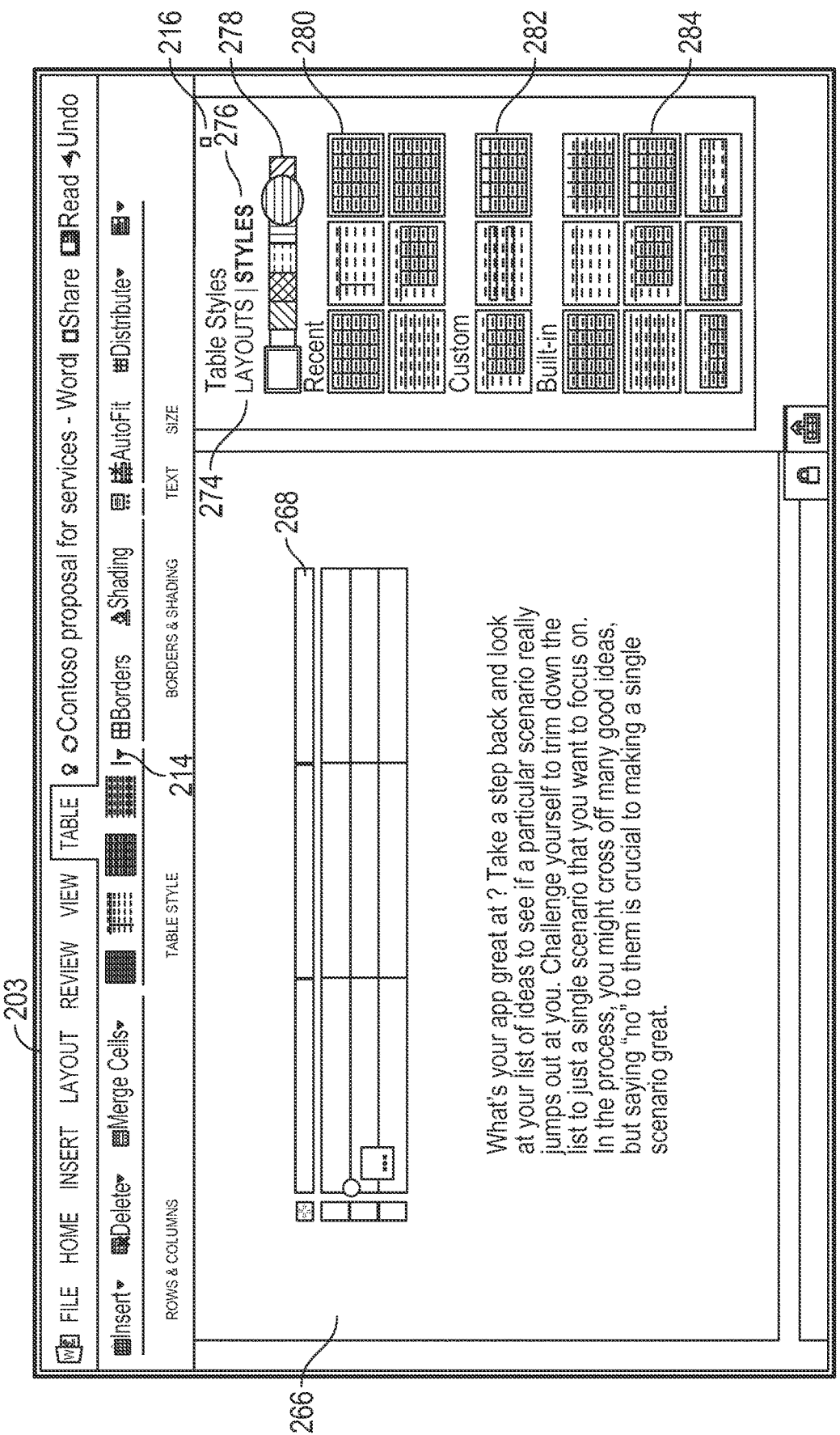

Referring now to FIG. 2H, insertion and formatting/layout of a table object in a word processing document is illustrated and described in accordance with embodiments of the present invention. As illustrated in FIG. 2H, the user interface 203 associated with an example word processing application is provided, and an array of top level functionality commands 202 is provided for application to a word processing 266. As illustrated in FIG. 2H, selection of a table function 264 may cause a display of an array 265 of one or more functionality commands that may be applied for inserting, laying out, formatting and otherwise structuring a table object in association with the example word processing document 266. As illustrated in FIG. 2H, the array 265 and the functionality commands including objects that may be inserted is provided in response to a selection of a top level command 264.

As illustrated and described above in reference to FIGS. 2A-2C, the gallery or array of functionality commands was provided in response to the selection of a child functionality command of a top level functionality command. As should be appreciated, a gallery or array of selectable functionality commands where the gallery or array of selectable functionality commands is a subset of a larger number of functionality commands may be provided upon selection of a top level functionality command 264, as illustrated in FIG. 2H. Referring still to FIG. 2H, a down arrow icon 214 is provided for allowing a user to selectively deploy a contextual pane 216 for receiving additional selectable functionality commands that may be utilized for application to the example table object 268 illustrated in the word processing document 266. A soft keyboard 270 is illustrated with which data may be entered in the document 266 or in the table object 268, as desired.

Referring now to FIG. 2I, upon selection of the down arrow 214, or other suitable means described above for deploying the contextual pane 216, the contextual pane 216 is deployed adjacent to the displayed word processing document 266 for applying a layout or style to the table object 268 contained in the document 266. The pane 266 table layouts function 274 and table styles function 276 are provided for allowing a user to display selectable layout objects and selectable style objects for application to the table object 268, as described herein. A color bar 278 is provided for allowing a user to selectively apply a variety of colors to the table object 268. Different arrays 280, 282, 284 provide different selectable layout objects that may be used for the table object 268. For example, the recent table layouts 280 include a variety of table layouts most recently used by the present user or in association with the software application in use. The custom layouts array 282 includes one or more custom table layouts generated for use in association with desired data sets. The built-in array 284 may include one or more table layout objects that have been provided with the software application and corresponding user interface 200.

Figure 2J:
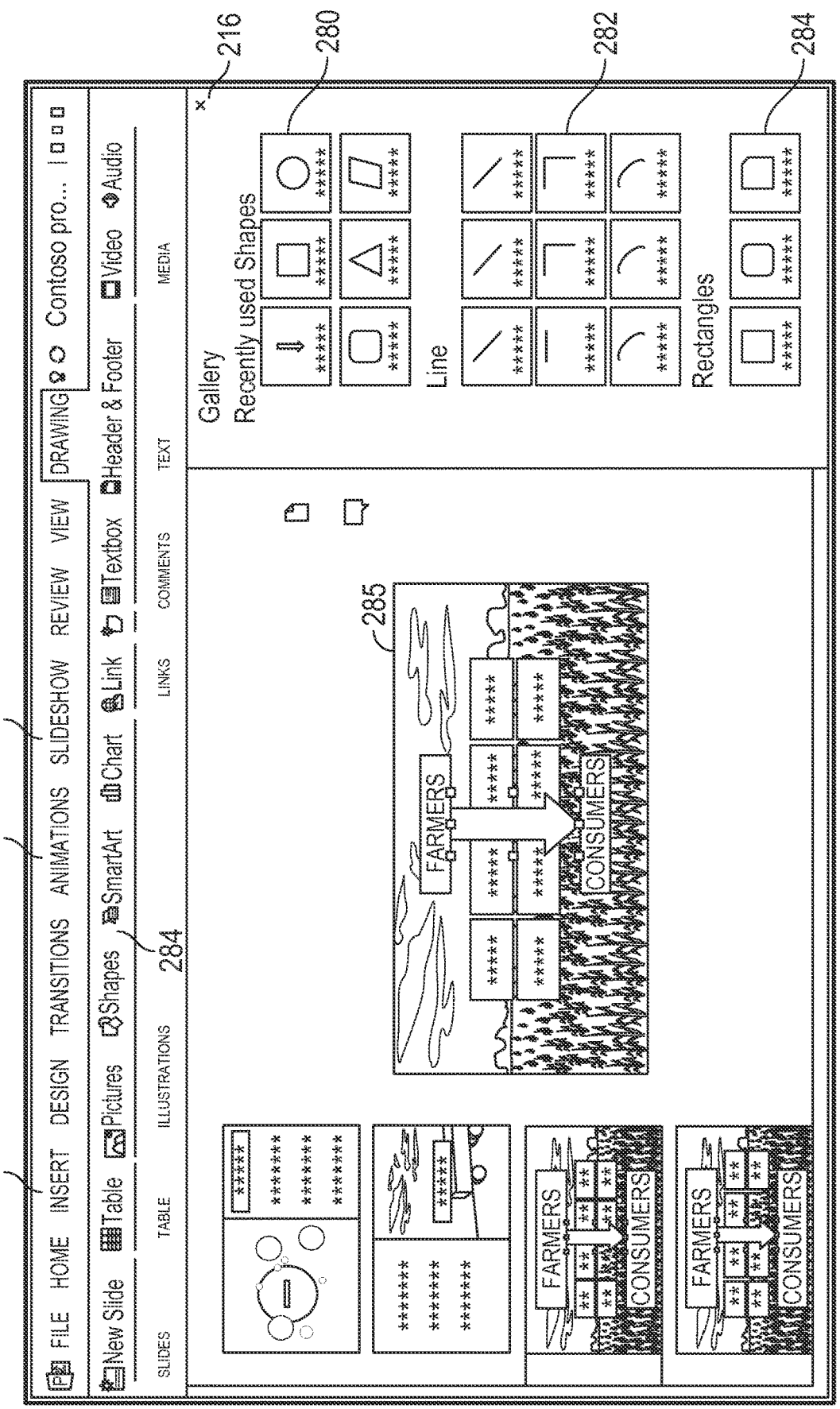
FIG. 2J illustrates a computer generated user interface with which a variety of commands and/or functions may be applied to a given content item and illustrates deployment and display of a contextual pane showing additional functions and commands available under the selected parent command.
Figure 3:
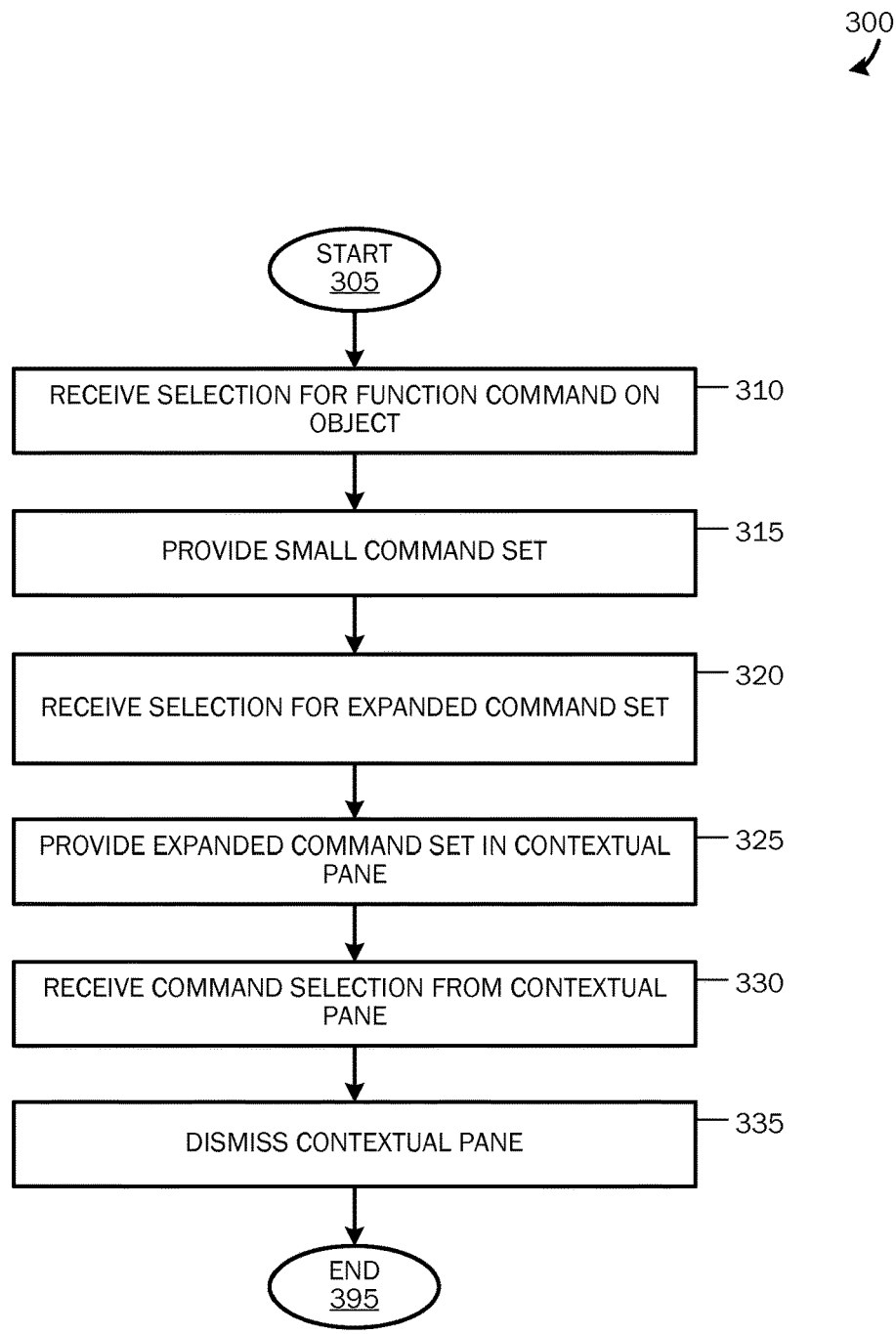
FIG. 3 is a flowchart illustrating a method for providing progressive functionality command and object access for object and other content insertion and modification.

Referring now to FIG. 2J, another example user interface 200 associated with a slide presentation application is illustrated. As illustrated in FIG. 2J, a content item 285 is provided in the user interface 200, and a contextual pane 216 containing a number of different shapes and shape styles is displayed for applying various objects and object styles to a content item 285. As illustrated in FIG. 2J, an example application of embodiments to the present invention includes a selection of the insert tab 283 followed by selection by the shapes functionality command 284, followed by deployment of the contextual pane 216. Once the contextual pane 216 is deployed, various shapes and shape styles, for example, the down arrow shape illustrated in FIG. 2J, may be selected for inclusion or application to the content item 285, as described herein.

Having described a system architecture, various user interface components and various aspects of embodiments of the present invention with respect to FIGS. 1 through 2J, FIG. 3 is a flowchart illustrating a method for providing progressive functionality command and object access for object insertion and modification. The routine 300 begins at start operation 305 and proceeds to operation 310 where a selection for a functionality command for inserting or modifying a given object in a user interface is received. At operation 315, a small functionality command set may be provided from which a user may select a given functionality command for inserting or modifying an object in a content item, for example, a word processing document, a slide presentation document, spreadsheet document, a notes document, a calendaring entry, and the like.

At operations 320 and 325, a selection is received on a down arrow icon 214, or another suitable operation is received, as described above, for causing a provision and display of a contextual pane 216 in which additional functionality commands may be provided for inserting and/or modifying an object such as a table object, shape object, picture object, clipart object, and the like in an associated content item. At operation 330, a selection of a functionality command provided and displayed in a contextual pane 216 is received, and an object associated with the received functionality command is inserted or modified in association with the received functionality command.

At operation 335, if the user has completed use of the contextual pane, the user may manually dismiss the context pane, or the contextual pane 216 may remain in position until it is dismissed automatically when it is no longer relevant to the context of a content item being generated or being edited, or if it is no longer relevant to one or more functionality commands being utilized by the user. Alternatively, the contextual pane 216 may be dismissed after a period of inactivity has elapsed during which time no functionality commands from the contextual pane are utilized. In addition, the contextual pane may be dismissed if it is displayed on a small form device, and a determination is made that display space being occupied by the pane 216 is needed for other displayed items.

The routine 300 ends at operation 395.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
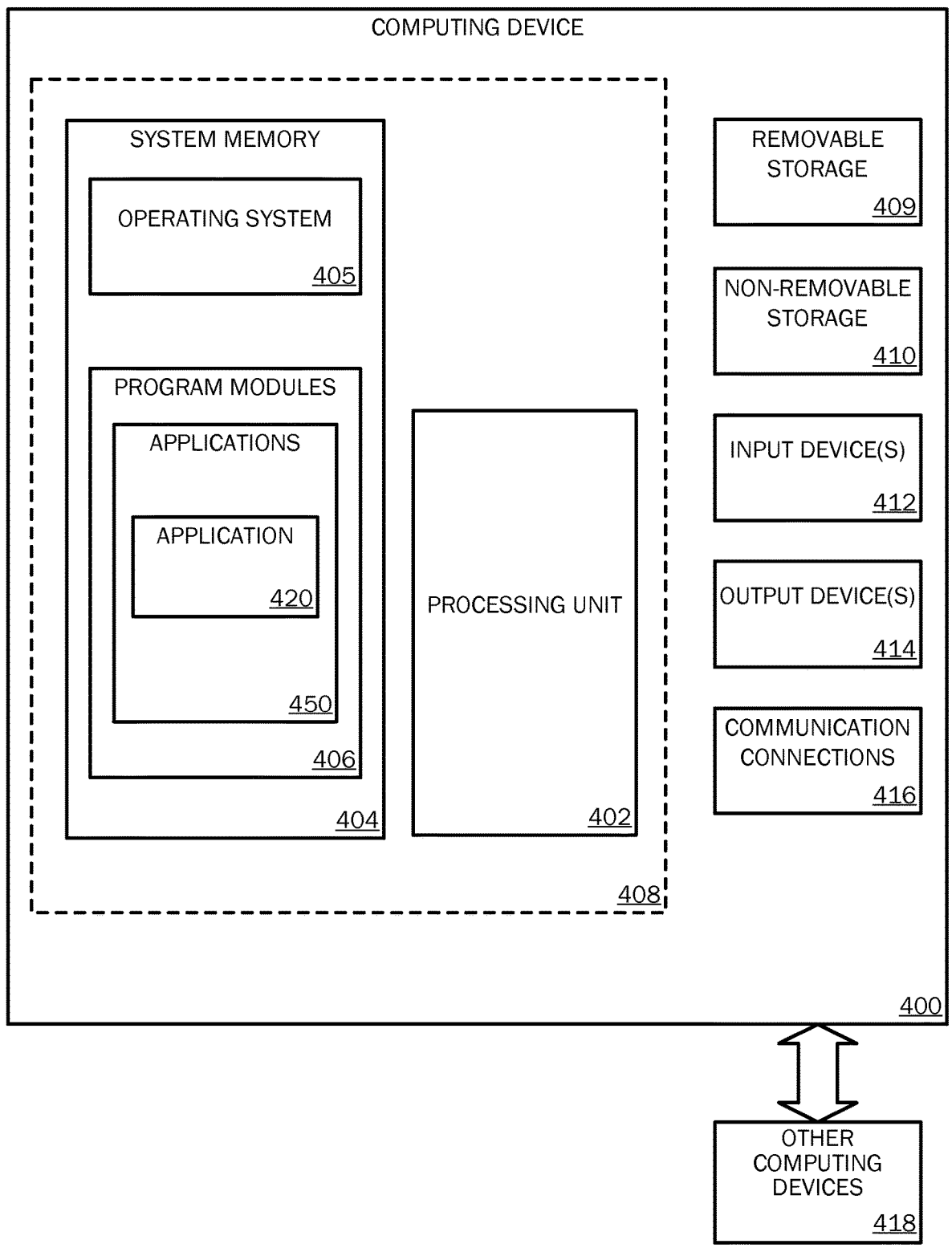
FIG. 4 is a block diagram illustrating example physical components of a computing device with which embodiments of the invention may be practiced.
Figure 5A:
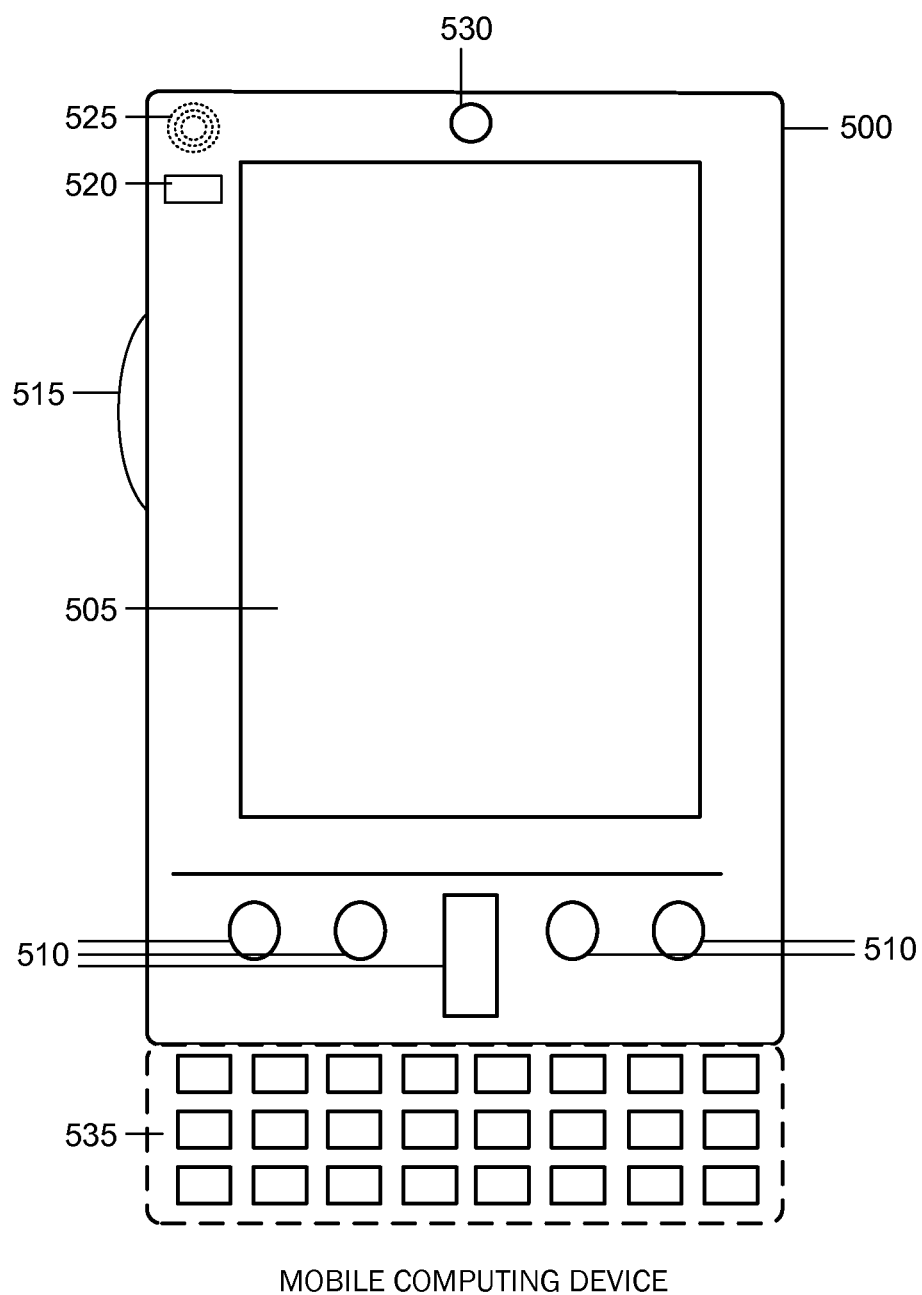
FIGS. 5A and 5B are simplified block diagrams of a mobile computing device with which embodiments of the present invention may be practiced.
Figure 5B:
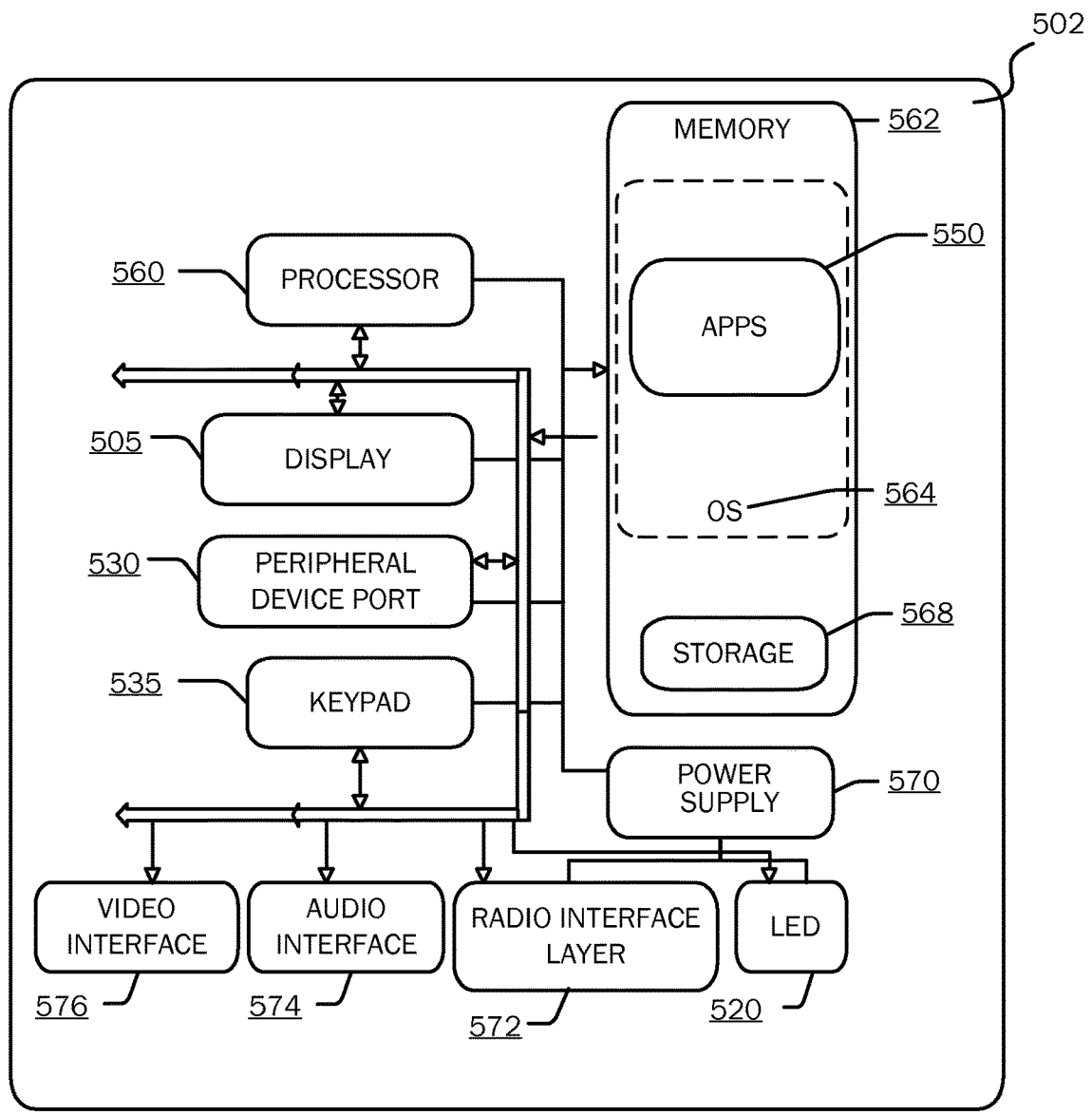
Figure 6:
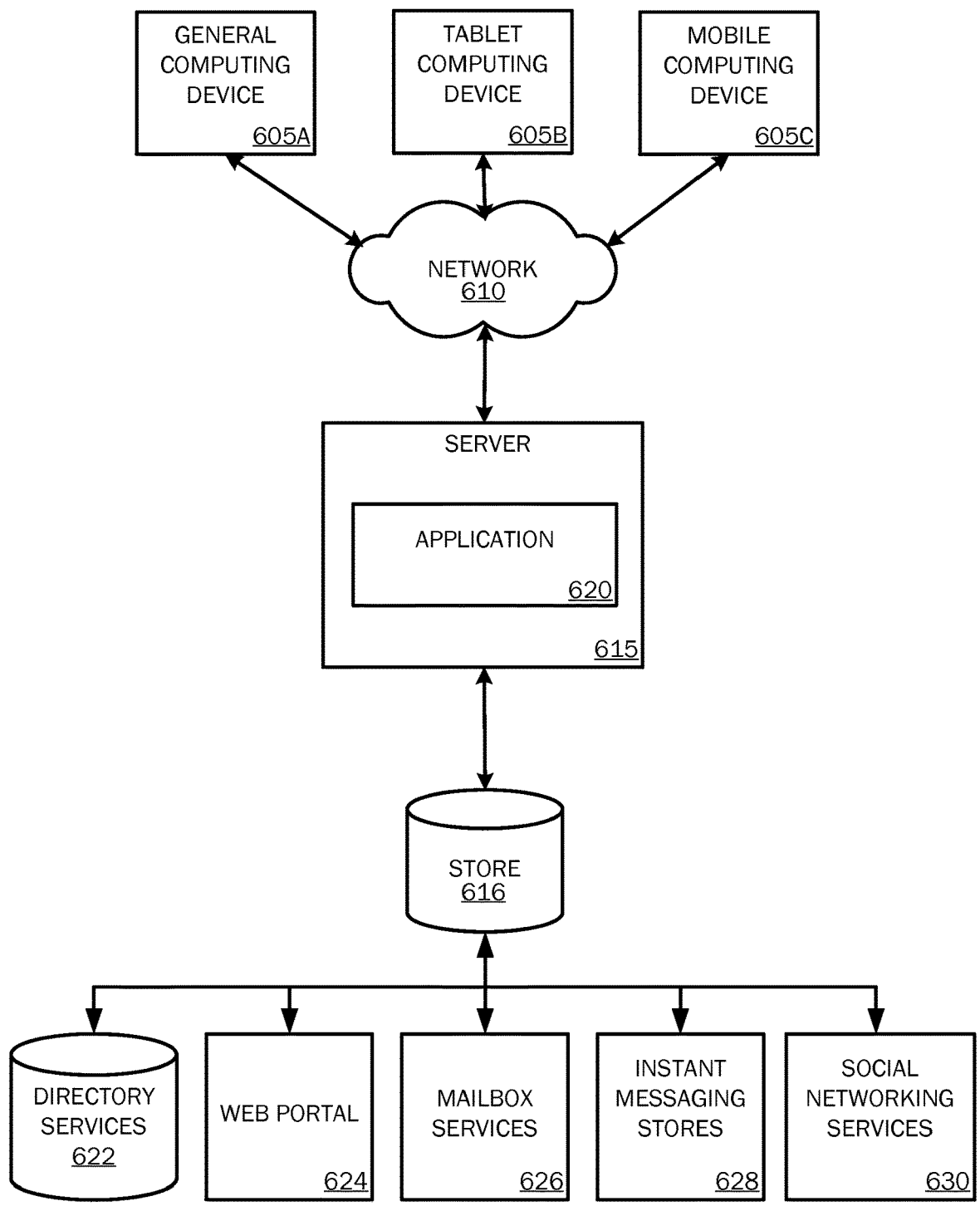
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the computing device 110 described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 such as client application 420. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 300 illustrated in FIG. 3. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing surfacing of functionalities in a pane 216 may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing surfacing of functionalities via a pane 216, as described above. Content developed, interacted with, or edited in association with the application 620 may be stored in different communication channels or other storage types. For example, various documents may be stored using a directory service 622, a web portal 624, a mailbox service 626, an instant messaging store 628, or a social networking site 630. The application 620 may use any of these types of systems or the like for surfacing functionalities via a pane 216, as described herein. A server 615 may provide the application 620 to clients 110. As one example, the server 615 may be a web server providing the application 620 over the web. The server 615 may provide the application 620 over the web to clients through a network 610. By way of example, the client computing device 110 may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for providing progressive functionality access, the method comprising:
   in a computer-generated application user interface, providing an array of functionality commands for application to a content item being generated or edited in the application user interface;
   in response to receiving a selection of a particular functionality command in the array of functionality commands, and in response to a determination that a logical subset of functionalities is available under the selected functionality command, providing an array of the logical subset of functionalities in the application user interface for application to the content item; and
   in response to receiving the selection of the particular functionality command in the array of functionality commands, and in response to a determination that a logical subset of functionalities is not available under the selected functionality command, automatically providing in the application user interface a contextual functionalities pane that includes one or more functionalities for application to the content item, wherein the contextual functionalities pane is displayed simultaneously with the array of functionality commands.

2. The method of claim 1, wherein the logical subset of functionalities is provided based on an historical usage of one or more functionalities available in the application user interface.

3. The method of claim 1, wherein the logical subset of functionalities includes one or more functionalities most recently used by a user of the application user interface.

4. The method of claim 1, wherein the contextual functionalities pane is provided in the application user interface in proximity to a workspace in the application user interface in which one or more content items are generated or edited for allowing application of the one or more functionalities in the contextual functionalities pane to content items in the workspace.

5. The method of claim 4, wherein the one or more functionalities provided in the contextual functionalities pane are displayed in an order based on an historical usage of the one or more functionalities.

6. The method of claim 4, wherein the one or more functionalities provided in the contextual functionalities pane are displayed in an order based on a context of a content item in the workspace to which the one or more functionalities may be applied.

7. The method of claim 6, wherein one or more functionalities that may be used in association with one or more components of the content item are provided in the contextual functionalities pane.

8. The method of claim 6, wherein one or more functionalities that may be used in association with a selected component of the content item in the workspace are provided in the contextual functionalities pane.

9. The method of claim 4, wherein if a given component of the content item is associated with a given functionality in the contextual functionalities pane, highlighting the given functionality in the contextual functionalities pane.

10. The method of claim 1, wherein providing the contextual functionalities pane in the application user interface is in response to receiving a selection of a functionalities pane control displayed in association with the particular functionality command.

11. The method of claim 1, wherein providing the contextual functionalities pane in the application user interface is in response to receiving a selection in a display space of the application user interface where the contextual functionalities pane is displayed when provided.

12. The method of claim 1, wherein providing the contextual functionalities pane in the application user interface is in response to receiving a selection on a component of the content item to which one of the one or more functionalities of the contextual functionalities pane may be applied.

13. The method of claim 1, wherein a display of the contextual functionalities pane is maintained in the application user interface until a context of the content item for which the contextual functionalities pane is provided changes.

14. The method of claim 1, wherein a display of the contextual functionalities pane is maintained in the application user interface until one of a manual dismissal of the contextual functionalities pane, a selection in the application user interface outside the contextual functionalities pane, or a timeout period in which no functionality is selected from the contextual functionalities pane.

15. The method of claim 1, wherein the one or more functionalities provided in the contextual functionalities pane include one or more of an object insertion function, an object formatting function, an object layout function, or an object structuring function.

16. The method of claim 15, wherein in response to selection of one of the one or more functionalities provided in the contextual functionalities pane, applying the selected functionality to a designated content item in the application user interface.

17. A method for providing progressive functionality access, the method comprising:
- in a computer-generated application user interface, providing an array of functionality commands for application to a content item being generated or edited in the application user interface;
- in response to a selection of an area of the application user interface used to provide a contextual pane, providing the contextual pane that includes at least one of one or more additional functionality commands or one or more functionalities;
- in response to a selection of a particular functionality command in the array of functionality commands, providing an array of a logical subset of functionalities in the application user interface when the logical subset of functionalities is available, wherein the array is displayed simultaneously with the array of functionality commands; and
- in response to a selection of the particular functionality command in the array of functionality commands, automatically
- providing a contextual functionalities pane that is displayed simultaneously with the array of functionality commands in the application user interface when the logical subset of functionalities is not available, wherein the contextual functionalities pane includes one or more functionalities associated with the selected functionality command.

18. The method of claim 17, further comprising in response to a selection of a particular object in the content item, automatically providing a contextual functionalities pane that includes one or more functionalities for application to the selected object, wherein the one or more functionalities included in the contextual pane are based at least in part on an object type associated with the selected object.

19. A computer storage media storing computer executable instructions, which when executed by a computer perform a method for providing progressive functionality access, the method comprising:
- in a computer-generated application user interface, providing an array of functionality commands for application to a content item being generated or edited in the application user interface;
- in response to a selection of a particular functionality command, providing a logical subset of functionalities associated with the selected functionality command in the application user interface, wherein the logical subset of functionalities is displayed simultaneously with the array of functionality commands;
- in response to the providing of the logical subset of functionalities and a selection of an area of the application user interface used to provide a contextual functionalities pane, providing the contextual functionalities pane that includes one or more additional functionalities associated with the selected functionality command;
- if no logical subset of functionalities is available, then forgoing a provision of the logical subset of functionalities and providing in the application user interface a contextual functionalities pane that includes one or more functionalities available under the selected functionality command; and
- automatically removing the contextual functionalities pane from the application user interface based on a change to the selection of the particular functionality command.

20. The computer storage media of claim 19, wherein the method further comprises in response to a selection of a particular object in the content item, automatically providing a contextual functionalities pane that includes one or more functionalities for application to the selected object, wherein the one or more functionalities included in the contextual pane are based at least in part on an object type associated with the selected object.

* * * * *